United States Patent
Nishiura

(10) Patent No.: US 11,787,409 B2
(45) Date of Patent: Oct. 17, 2023

(54) DRIVING ASSIST DEVICE, DRIVING ASSIST METHOD, AND DRIVING ASSIST SYSTEM

(71) Applicant: Hitachi Automotive Systems, Ltd., Hitachinaka (JP)

(72) Inventor: Chikara Nishiura, Atsugi (JP)

(73) Assignee: Hitachi Astemo, Ltd., Hitachinaka (JP)

(*) Notice: Subject to any disclaimer, the term of this patent is extended or adjusted under 35 U.S.C. 154(b) by 299 days.

(21) Appl. No.: 16/969,236

(22) PCT Filed: Jan. 7, 2019

(86) PCT No.: PCT/JP2019/000069
§ 371 (c)(1),
(2) Date: Aug. 12, 2020

(87) PCT Pub. No.: WO2019/159562
PCT Pub. Date: Aug. 22, 2019

(65) Prior Publication Data
US 2021/0001859 A1    Jan. 7, 2021

(30) Foreign Application Priority Data
Feb. 13, 2018    (JP) .................... 2018-023315

(51) Int. Cl.
*B60W 30/18*    (2012.01)
*B60W 40/068*    (2012.01)
*B60W 40/10*    (2012.01)

(52) U.S. Cl.
CPC .... *B60W 30/18172* (2013.01); *B60W 40/068* (2013.01); *B60W 40/10* (2013.01);
(Continued)

(58) Field of Classification Search
None
See application file for complete search history.

(56) References Cited

U.S. PATENT DOCUMENTS

| 7,424,357 | B2 * | 9/2008 | Ozaki | B60T 8/17557 |
| | | | | 701/70 |
| 7,681,960 | B2 * | 3/2010 | Wanke | B60T 8/17555 |
| | | | | 701/72 |

(Continued)

FOREIGN PATENT DOCUMENTS

| JP | 2003-118556 A | | 4/2003 |
| JP | 2003118556 | * | 4/2003 |

(Continued)

OTHER PUBLICATIONS

International Search Report (PCT/ISA/210) issued in PCT Application No. PCT/JP2019/000069 dated Mar. 12, 2019 with English translation (three (3) pages).

(Continued)

*Primary Examiner* — Jelani A Smith
*Assistant Examiner* — Jacob Daniel Underbakke
(74) *Attorney, Agent, or Firm* — Crowell & Moring LLP

(57) ABSTRACT

The invention ensures a proper vehicle attitude even if a friction coefficient of a contacted road surface with respect to wheels is small. A driving assist device obtains a first moment that is a moment necessary for an subject vehicle to follow a running course, on the basis of information about a running coursed of an subject vehicle, which is obtained on the basis of external environment information of the subject vehicle, which is acquired by an external environment recognition portion, a first physical quantity associated with a motion state of the subject vehicle, which is inputted by a vehicle motion state detection sensor, and specifications of the subject vehicle, further obtains a second moment that is a moment that can be generated in the subject vehicle on the basis of a friction coefficient of a contacted road surface with respect to the wheels of the subject vehicle, which is acquired by a road surface condition acquisition portion, and a second physical quantity associated with a motion state of (Continued)

the subject vehicle, which is inputted by the vehicle motion state detection sensor, and outputs to a braking control device a command to implement control for making a braking force generated in rear wheels of the wheels greater than a braking force generated in front wheels when the second moment is smaller than the first moment.

8 Claims, 8 Drawing Sheets

(52) U.S. Cl.
CPC ..... *B60W 2520/00* (2013.01); *B60W 2552/40* (2020.02); *B60W 2555/00* (2020.02)

(56) References Cited

U.S. PATENT DOCUMENTS

| | | | | |
|---|---|---|---|---|
| 7,698,032 | B2* | 4/2010 | Matsumoto | B60T 8/17557 701/79 |
| 8,126,626 | B2* | 2/2012 | Zagorski | B60T 7/22 701/72 |
| 8,670,903 | B2* | 3/2014 | Lee | B62D 15/025 701/28 |
| 9,108,600 | B2* | 8/2015 | Hartmann | B60T 8/17558 |
| 9,233,692 | B2* | 1/2016 | Zagorski | B62D 6/003 |
| 9,376,107 | B2* | 6/2016 | Suzuki | B60W 30/045 |
| 9,827,982 | B2* | 11/2017 | Owen | B60W 30/18145 |
| 2008/0120003 | A1* | 5/2008 | Nihei | B60W 10/08 701/69 |
| 2011/0264300 | A1* | 10/2011 | Tuononen | B60W 40/068 701/1 |
| 2012/0083981 | A1* | 4/2012 | Nihei | B60T 8/1755 701/69 |
| 2016/0001781 | A1* | 1/2016 | Fung | G16H 50/20 701/36 |
| 2017/0355397 | A1* | 12/2017 | Watanabe | B60W 30/02 |

FOREIGN PATENT DOCUMENTS

| | | | | |
|---|---|---|---|---|
| JP | 2006-193156 | A | 7/2006 | |
| JP | 3850530 | B2 * | 11/2006 | ........... B60T 8/1755 |
| JP | 2008201358 | A * | 9/2008 | ............... B60G 3/20 |
| JP | 6381069 | B2 | 8/2018 | |
| WO | WO-2015053169 | A1 * | 4/2015 | ................ B60T 7/12 |

OTHER PUBLICATIONS

Japanese-language Written Opinion (PCT/ISA/237) issued in PCT Application No. PCT/JP2019/000069 dated Mar. 12, 2019 with English translation (10 pages).

* cited by examiner

Fig. 6

GAIN OF BRAKING FORCE IMPARTED TO REAR WHEELS

| | | DEVIATION ANGLE $\theta_{sp}$ | | | | | | | | | |
|---|---|---|---|---|---|---|---|---|---|---|---|
| | | 0 | 2 | 4 | 6 | 8 | 10 | 12 | 14 | 16 | 18 | 20 |
| LANE DEPARTURE RISK COR | 0.1 | 1 | 1 | 1 | 1 | 1 | 1 | 1 | 1.1 | 1.2 | 1.3 |
| | 0.2 | 1 | 1 | 1 | 1 | 1 | 1 | 1.1 | 1.2 | 1.2 | 1.3 |
| | 0.3 | 1 | 1 | 1 | 1 | 1 | 1 | 1.1 | 1.2 | 1.2 | 1.3 |
| | 0.4 | 1 | 1 | 1 | 1 | 1 | 1 | 1.1 | 1.2 | 1.2 | 1.3 |
| | 0.5 | 1 | 1 | 1 | 1 | 1 | 1.1 | 1.2 | 1.2 | 1.3 | 1.3 |
| | 0.6 | 1 | 1 | 1 | 1 | 1 | 1.1 | 1.2 | 1.2 | 1.3 | 1.3 |
| | 0.7 | 1.1 | 1.1 | 1.1 | 1.1 | 1.1 | 1.2 | 1.2 | 1.3 | 1.3 | 1.3 |
| | 0.8 | 1.2 | 1.2 | 1.2 | 1.2 | 1.2 | 1.2 | 1.3 | 1.3 | 1.3 | 1.3 |
| | 0.9 | 1.3 | 1.3 | 1.3 | 1.3 | 1.3 | 1.3 | 1.3 | 1.3 | 1.3 | 1.3 |
| | 1.0 | 1.4 | 1.4 | 1.4 | 1.4 | 1.4 | 1.4 | 1.4 | 1.4 | 1.4 | 1.4 |

Fig. 7

DISTRIBUTION OF BRAKING FORCE TO RIGHT AND LEFT REAR WHEELS
(1: 100% DISTRIBUTION TO INNER-TURNING WHEEL, 0.5: EQUAL DISTRIBUTION TO RIGHT AND LEFT REAR WHEELS)

|  |  | \multicolumn{10}{c}{DEVIATION ANGLE $\theta_{sp}$} |
|---|---|---|---|---|---|---|---|---|---|---|---|
|  |  | 0 | 2 | 4 | 6 | 8 | 10 | 12 | 14 | 16 | 18 | 20 |
| LANE DEPARTURE RISK COR | 0.1 |  | 1 | 1 | 1 | 1 | 1 | 0.9 | 0.8 | 0.7 | 0.6 | 0.5 |
| | 0.2 |  | 1 | 1 | 1 | 1 | 0.9 | 0.8 | 0.7 | 0.6 | 0.5 | 0.5 |
| | 0.3 |  | 1 | 0.9 | 0.9 | 0.9 | 0.8 | 0.7 | 0.6 | 0.5 | 0.5 | 0.5 |
| | 0.4 |  | 0.9 | 0.8 | 0.7 | 0.7 | 0.7 | 0.6 | 0.5 | 0.5 | 0.5 | 0.5 |
| | 0.5 |  | 0.8 | 0.7 | 0.6 | 0.6 | 0.6 | 0.5 | 0.5 | 0.5 | 0.5 | 0.5 |
| | 0.6 |  | 0.7 | 0.6 | 0.6 | 0.6 | 0.5 | 0.5 | 0.5 | 0.5 | 0.5 | 0.5 |
| | 0.7 |  | 0.6 | 0.5 | 0.5 | 0.5 | 0.5 | 0.5 | 0.5 | 0.5 | 0.5 | 0.5 |
| | 0.8 |  | 0.5 | 0.5 | 0.5 | 0.5 | 0.5 | 0.5 | 0.5 | 0.5 | 0.5 | 0.5 |
| | 0.9 |  | 0.5 | 0.5 | 0.5 | 0.5 | 0.5 | 0.5 | 0.5 | 0.5 | 0.5 | 0.5 |
| | 1.0 |  | 0.5 | 0.5 | 0.5 | 0.5 | 0.5 | 0.5 | 0.5 | 0.5 | 0.5 | 0.5 |

DRIVING ASSIST DEVICE, DRIVING ASSIST METHOD, AND DRIVING ASSIST SYSTEM

TECHNICAL FIELD

The invention relates to driving assist devices, driving assist methods, and driving assist systems, and more specifically, to the technique of generating a moment necessary for an subject vehicle to follow a running course by controlling a braking force.

BACKGROUND ART

Patent Literature 1 discloses a lane departure prevention device including a departure sensor device configured to sense that an subject vehicle is about to depart from a driving lane, and a driving/braking force control device configured to generate a yaw moment in a direction that avoids a lane departure by using difference in braking force between right and left wheels when the departure sensor device senses that the subject vehicle is about to depart from the driving lane.

CITATION LIST

Patent Literature

PTL 1: Japanese Unexamined Patent Application Publication (Kokai) No. 2006-193156

SUMMARY OF INVENTION

Technical Problem

The lane departure prevention device disclosed in Patent Literature 1 controls a braking force, regardless of a friction coefficient of a contacted road surface with respect to wheels, and therefore is not capable of generating a yaw moment necessary for repressing lane departures when the friction coefficient is small as seen in a situation where a vehicle runs on a snow-covered road. An subject vehicle then has the possibility to depart from a running course thereof.

The invention has been made in light of these actual circumstances. An object of the invention is to provide a driving assist device, a driving assist method, and a driving assist system which ensure a proper vehicle attitude even if a friction coefficient of a contacted road surface with respect to wheels is small.

Solution to Problem

The invention according to one aspect provides a driving assist device configured to obtain a first moment that is a moment necessary for an subject vehicle to follow a running course, on the basis of information about the subject vehicle's running course obtained on the basis of external environment information of the subject vehicle, which is acquired by an external environment recognition portion, a first physical quantity associated with a motion state of the subject vehicle, which is inputted by a vehicle motion state detection sensor, and specifications of the subject vehicle, obtain a second moment that is a moment that can be generated in the subject vehicle on the basis of a friction coefficient of a contacted road surface with respect to wheels of the subject vehicle, which is acquired by a road surface condition acquisition portion, and a second physical quantity associated with a motion state of the subject vehicle, which is inputted by the vehicle motion state detection sensor, and output to a braking control device a command to implement control for making a braking force generated in rear wheels of the wheels greater than a braking force generated in front wheels when the second moment is smaller than the first moment.

According to the one aspect of the invention, it is possible to ensure a proper vehicle attitude and stably repress lane departures even if the friction coefficient of the contacted road surface with respect to the wheels is small.

BRIEF DESCRIPTION OF DRAWINGS

FIG. 6 shows one aspect of correlation between a gain of a braking force imparted to rear wheels and a deviation angle $\theta_{sp}$ and the lane departure risk COR.

FIG. 7 shows one aspect of correlation between distribution of the braking force applied to right and left rear wheels and the deviation angle $\theta_{sp}$ and the lane departure risk COR.

DESCRIPTION OF EMBODIMENTS

The following description explains an embodiment of a driving assist device, a driving assist method, and a driving assist system according to the invention with reference to the attached drawings.

Figure 1:
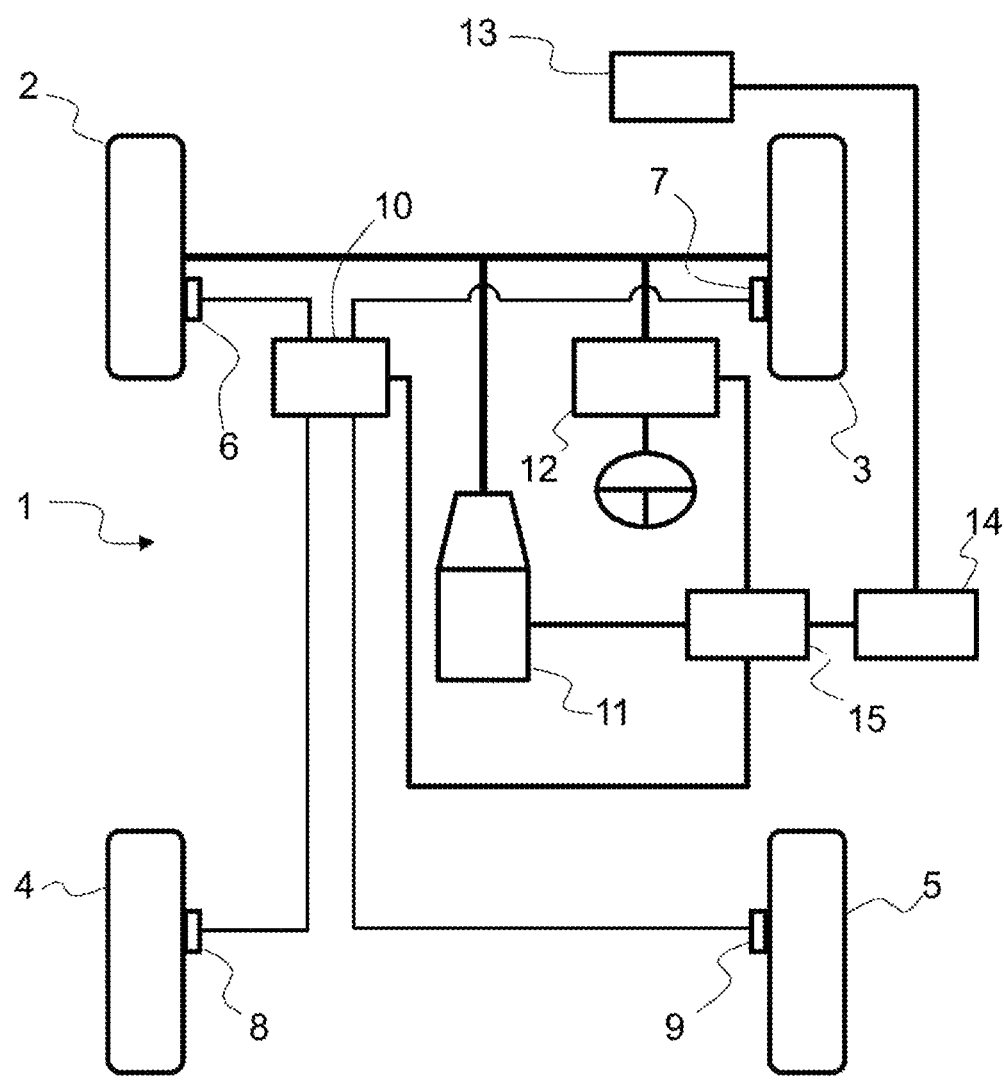
FIG. 1 is a block diagram showing one aspect of a hardware configuration of a driving assist system.

FIG. 1 is a block diagram showing one aspect of a hardware configuration of a driving assist system according to the embodiment of the invention.

According to one aspect, a vehicle of the present embodiment includes a device that reads information about a road ahead of the vehicle by using a camera, a GPS (Global Positioning System), and map information altogether or in another way; a steering device that is capable of independent steering; and a skidding prevention device in which information of running speed of the vehicle, information for estimating a running state of the vehicle and a friction coefficient μ of a road surface on which the vehicle runs, and other like information are collected.

A vehicle 1 is a four-wheel vehicle with a left front wheel 2, a right front wheel 3, a left rear wheel 4, and a right rear wheel 5. The wheels 2 to 5 include wheel cylinders 6 to 9, respectively, which form a hydraulic brake system.

Hydraulic pressures of the wheel cylinders 6 to 9 are adjusted by a wheel cylinder hydraulic pressure control device (braking control device) 10 as typified by a skidding prevention device.

A braking device of the vehicle 1 is not limited to a hydraulic friction brake and may be an electric friction brake.

An engine 11 is an internal combustion engine that is, for example, provided with an electronic control throttle to electronically control an output torque.

A steering device 12 is an automatically steerable steering device including an actuator relating to steering, which is typified by an electric power steering device including a motor that generates a steering assist force.

An external environment recognition control unit 13 is an external environment recognition portion that processes map information and image information obtained by camera and thus acquires information about an external environment ahead of an subject vehicle.

A behavior strategy controller 14 computes information about road edges, a target running course (target locus) and the like on the basis of the external environment information obtained by the external environment recognition control unit 13. The behavior strategy controller 14 also computes a lane departure risk of the subject vehicle, a yaw moment for repressing a lane departure, and the like.

A motion strategy controller 15 decides a brake operation amount necessary for following the target locus on the basis of the target locus, the lane departure risk, the yaw moment, and the like which are computed by the behavior strategy controller 14. The motion strategy controller 15 then outputs a command relating to the brake operation amount to the wheel cylinder hydraulic pressure control device 10.

The external environment recognition control unit 13, the behavior strategy controller 14, and the motion strategy controller 15 have respective microcomputers and are configured to be communicable to other units through in-vehicle network.

Figure 2:
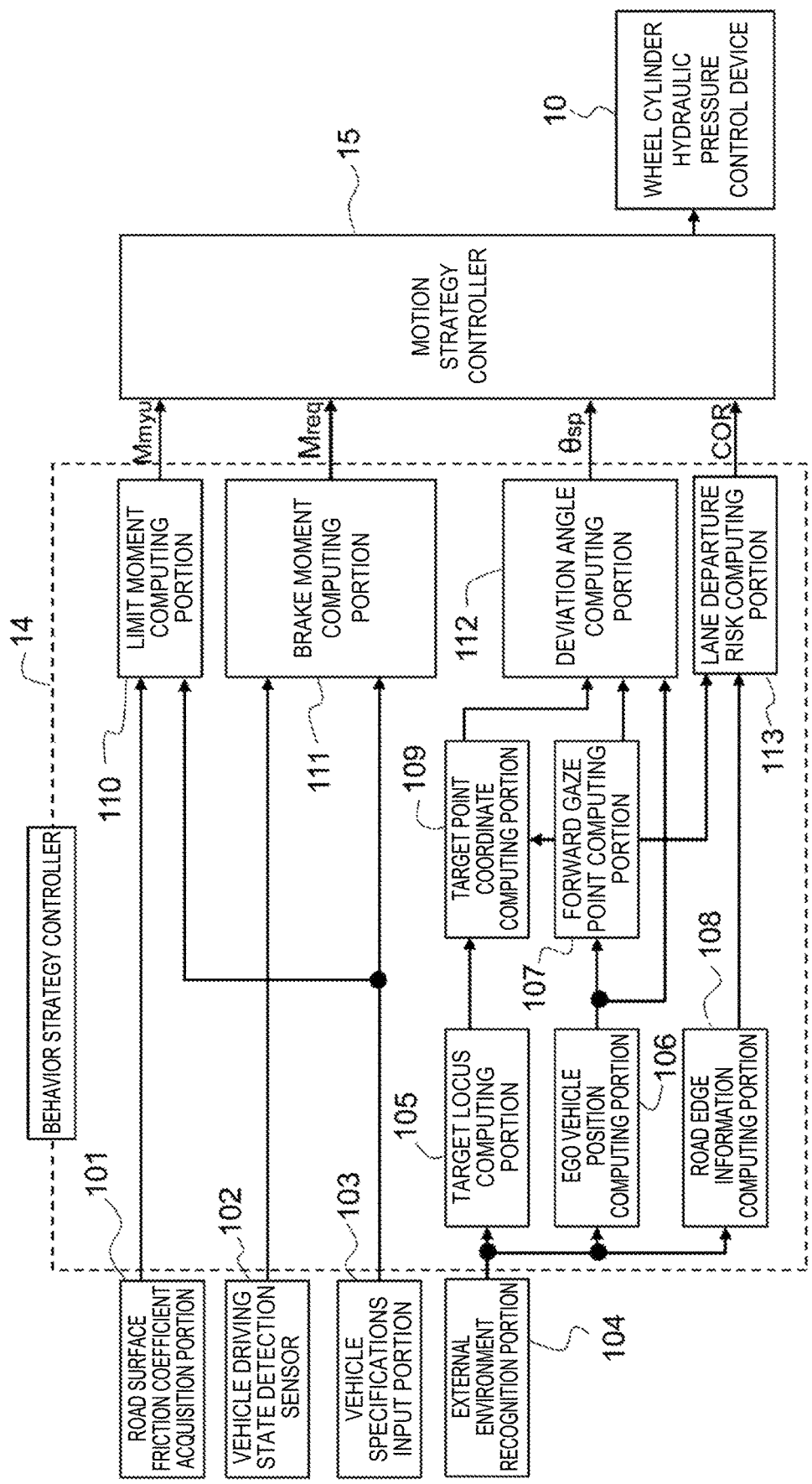
FIG. 2 is a function diagram of the driving assist system.

FIG. 2 is a function diagram of the driving assist system.

A road surface friction coefficient acquisition portion (road surface condition acquisition portion) 101 acquires information about the friction coefficient μ of a contacted road surface with respect to the wheels of the vehicle 1.

A vehicle driving state detection sensor 102 is a sensor that detects various kinds of physical quantities associated with a driving state of the vehicle. The vehicle driving state detection sensor 102 includes a yaw rate sensor that detects a yaw rate γ of the vehicle 1 (change rate of a rotational angle in a turning direction), a vehicle speed sensor that detects running speed V of the vehicle 1, a sensor that detects hydraulic brake pressure, and the like.

A vehicle specifications input portion 103 inputs information about a variety of specifications of the vehicle 1, including vehicle mass, wheel load, distance between a gravity center and a front axle, distance between the gravity center and a rear axle, a tread, and the like.

An external environment recognition portion 104 is a functioning portion provided to the external environment recognition control unit 13 shown in FIG. 1. The external environment recognition portion 104 processes map information and image information obtained by camera and acquires information about an external environment ahead of the subject vehicle.

A target locus computing portion 105 computes the target locus (target running course) on the basis of the information about the external environment ahead of the subject vehicle, which is acquired by the external environment recognition portion 104.

An subject vehicle position computing portion 106 computes a current position of the subject vehicle on the basis of the information about the external environment ahead of the subject vehicle, which is acquired by the external environment recognition portion 104.

A forward gaze point computing portion 107 computes a forward gaze point indicating a position of the subject vehicle after the elapse of a predetermined period of time from a current point of time, on the basis of the current position that is computed by the subject vehicle position computing portion 106.

The target locus, the current position, and the forward gaze point are conditions relating to the running course of the subject vehicle. The target locus computing portion 105, the subject vehicle position computing portion 106, and the forward gaze point computing portion 107 form a running course computing portion.

A road edge information computing portion 108 computes road edges (running width) of a lane on which the subject vehicle runs, on the basis of the information about the external environment ahead of the subject vehicle, which is acquired by the external environment recognition portion 104.

A target point coordinate computing portion 109 computes a point on the target locus, which is located closest to the forward gaze point, as a target point coordinate on the basis of the target locus computed by the target locus computing portion 105 and the forward gaze point computed by the forward gaze point computing portion 107.

A limit moment computing portion (second moment computing portion) 110 computes a largest yaw moment $M_{myu}$ (second moment) that can be generated in the subject vehicle under conditions of a current friction coefficient μ and a current hydraulic brake pressure (braking force), on the basis of the friction coefficient μ of the contacted road surface with respect to the wheels of the vehicle 1 which is acquired by the road surface friction coefficient acquisition portion 101, the tread inputted by the vehicle specifications input portion 103, the specifications of vehicle 1 which include wheel load and the like, and the hydraulic brake pressure (braking force) on each wheel, namely the physical quantities associated with the driving state of the subject vehicle which is detected by the vehicle driving state detection sensor 102.

A brake moment computing portion (first moment computing portion) 111 computes a required yaw moment $M_{req}$ (first moment) that is necessary for the subject vehicle to follow the target locus on the basis of the information about the running course of the subject vehicle which includes the target point coordinate, the forward gaze point, and the current position, the physical quantities (first physical quantity) associated with the driving state of the subject vehicle which include the running speed, the yaw rate and the like detected by the vehicle driving state detection sensor 102, the specifications of the vehicle 1 which include the vehicle mass, the distance between the gravity center and the front axle, the distance between the gravity center and the rear axle, and the like which are inputted by the vehicle specifications input portion 103.

A deviation angle computing portion 112 computes a deviation angle $\theta_{sp}$ that is an angle formed between a first straight line connecting the current position of the subject vehicle and the forward gaze point (forward position indicating a position of the subject vehicle after the elapse of a predetermined period of time) and a second straight line connecting the current position of the subject vehicle and the target point coordinate (target position located on the running course).

A lane departure risk computing portion 113 computes the lane departure risk COR that is a risk that the subject vehicle departs from the running width within which the subject vehicle runs, on the basis of the road edge information computed by the road edge information computing portion 108 and the forward gaze point computed by the forward gaze point computing portion 107.

In the present patent application, the running width refers to road width within which the vehicle is able to run in consideration of lane width (road edges), obstacles, and the like. A possibility of departure from the running width increases with an increase of a value of the lane departure risk COR.

The lane departure risk computing portion 113 creates a risk map in which a position on the target locus within the running width RW (target point coordinate) is a reference position. On the risk map, the lane departure risk COR is distributed so as to increase with an increase in distance from the reference position in right and left directions. With reference to the risk map, the lane departure risk computing portion 113 computes the lane departure risk COR at the forward gaze point.

The behavior strategy controller 14 has functions, in the form of software, which include the target locus computing 105, the subject vehicle position computing portion 106, the forward gaze point computing portion 107, the road edge information computing portion 108, the target point coordinate computing portion 109, the limit moment computing portion 110, the brake moment computing portion 111, the deviation angle computing portion 112, and the lane departure risk computing portion 113.

The behavior strategy controller 14 outputs to the motion strategy controller 15 the information including the largest yaw moment $M_{myu}$, the required yaw moment $M_{req}$, the deviation angle θsp, and the lane departure risk COR.

The motion strategy controller 15 decides a braking force distribution to the four wheels during the braking force control for making the subject vehicle to follow the target locus and outputs the braking force distribution to the wheel cylinder hydraulic pressure control device 10 on the basis of the largest yaw moment $M_{myu}$, the required yaw moment $M_{req}$, the deviation angle θsp, and the lane departure risk COR.

Figure 3:
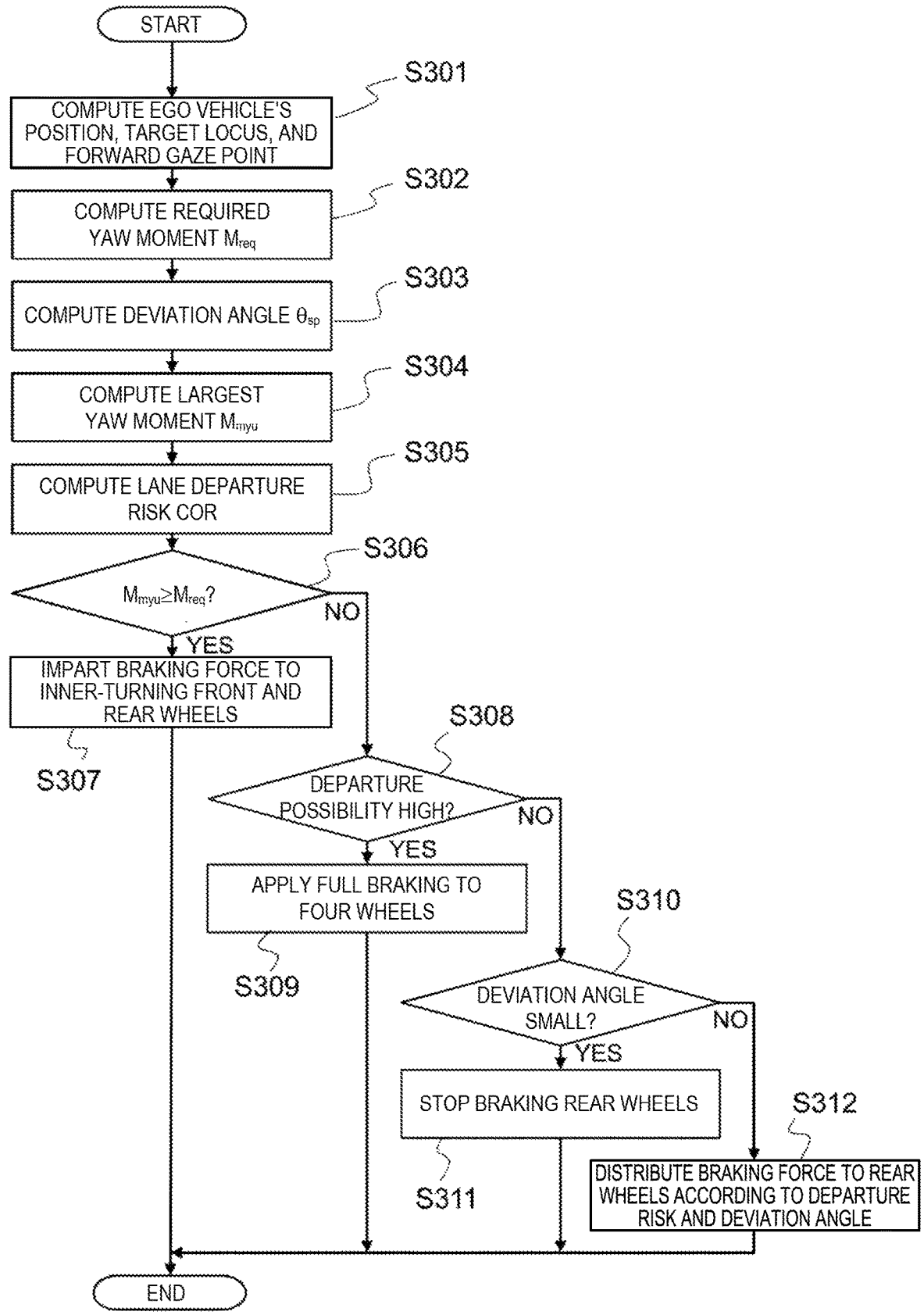
FIG. 3 is a flowchart showing a procedure of braking control implemented by the driving assist system.

FIG. 3 is a flowchart showing a procedure of the braking force control implemented by the behavior strategy controller 14 and the motion strategy controller 15.

At Step S301, the behavior strategy controller 14 computes a current position coordinate (Xv, Yv) indicating the current position of the subject vehicle and computes the target locus, taking into account a road shape, obstacles and the like ahead of the subject vehicle, on the basis of the information about the external environment ahead of the subject vehicle, which is acquired by the external environment recognition portion 104.

At Step S301, the behavior strategy controller 14 further computes the forward gaze point (Xs, Ys) indicating a position of the subject vehicle after the elapse of a predetermined period of time from the current point of time, on the basis of a current position coordinate (Xv, Yv).

At Step S302, the behavior strategy controller 14 computes the point on the target locus, which is located closest to the forward gaze point (Xs, Ys) as a target point coordinate (Xp, Yp), and computes the required yaw moment $M_{req}$ that is necessary for the subject vehicle to keep running along the target locus, on the basis of the target point coordinate (Xp, Yp), the forward gaze point (Xs, Ys), and the current position coordinate (Xv, Yv).

In order to compute the required yaw moment $Mr_{eq}$, the behavior strategy controller 14 first computes a course normative yaw rate γco from running speed V and a turning assist angle α. The course normative yaw rate γco is a yaw rate necessary for making the vehicle 1 run along the target locus obtained on the basis of the external environment information that is acquired by the external environment recognition portion 104.

$$\gamma co = V \times Kco$$

wherein Kco is a value of a function in which a variable is the turning assist angle α.

The behavior strategy controller 14 detects an actual yaw rate γca that is generated in the vehicle 1 on the basis of the output of the vehicle driving state detection sensor 102 (yaw rate sensor) and computes a yaw rate deviation Δγ(Δγ=γco−γca) that is deviation between the course normative yaw rate γco and the actual yaw rate γca.

The yaw rate deviation Δγ is a yaw rate necessary for the subject vehicle to remain in the target locus.

The behavior strategy controller 14 computes the required yaw moment $M_{req}$ in accordance with Mathematical 1 on the basis of the yaw rate deviation Δγ or the like. It should be noted that a positive required yaw moment $M_{req}$ represents a right turning moment, and a negative required yaw moment $M_{req}$ represents a left turning moment.

$$M_{req} = \frac{-2K_f K_r l^2 - (K_f l_f - K_r l_r) m V^2}{K_f + K_r} \times \frac{\Delta \gamma}{V} \quad \text{[Mathematical 1]}$$

wherein m is vehicle mass; V is running speed; $K_f$ is a cornering power of the front wheels; $K_r$ is a cornering power of the rear wheels; $l_f$ is distance between the gravity center and the front axle of the vehicle 1; $l_r$ is distance between the gravity center and a rear front axle of the vehicle 1; and l is a wheel base of the vehicle 1.

After computing the required moment $M_{req}$ as described above at Step S302, the behavior strategy controller 14 computes the deviation angle $\theta_{sp}$ that is an angle formed between the first straight line connecting the current position coordinate (Xv, Yv) and the forward gaze point (Xs, Ys) and the second straight line connecting the current position coordinate (Xv, Yv) and the target point coordinate (Xp, Yp) at the next Step S303.

The behavior strategy controller 14 then computes distance Gvs from the current position coordinate (Xv, Yv) to the forward gaze point (Xs, Ys), distance Gps from the forward gaze point (Xs, Ys) to the target point coordinate (Xp, Yp), and distance Gpv from the target point coordinate (Xp, Yp) to the current position coordinate (Xv, Yv). The behavior strategy controller 14 further computes the deviation angle $\theta_{sp}$ using a cosine formula on the basis of data of the distances Gvs, Gps and Gpv.

At Step S304, the behavior strategy controller 14 computes the largest yaw moment $M_{myu}$ that can be generated by the current braking force, on the basis of the friction coefficient μ of the road surface on which the vehicle runs.

For example, when the subject vehicle turns to the left, the left wheels are inner-turning wheels. The behavior strategy controller 14 therefore uses Mathematical 2 to compute the largest yaw moment $M_{myu}$ that is achievable.

$$M_{myu} = \frac{-\max F(x)_{FL} + \max F(x)_{RL}}{2} \times T_{red} \quad \text{[Mathematical 2]}$$

$$\max F(x)_{FL} = \mu \times WF_{FL}$$

$$\max F(x)_{RL} = \mu \times WF_{RL}$$

wherein maxF(x)$_{FL}$ is a braking force on the left front wheel; maxF(x)$_{RL}$ is a braking force on the left rear wheel; WF$_{FL}$ is load on the left front wheel; WF$_{RL}$, is load on the left rear wheel; μ is a road surface friction coefficient; and T$_{red}$ is the tread (center-to-center distance between the right and left axles) of the vehicle 1.

At Step S305, the behavior strategy controller 14 computes the lane departure risk COR at the forward gaze point (Xs, Ys).

A higher value of the lane departure risk COR indicates a higher probability that the subject vehicle departs from the running width RW (deviates from a course).

The behavior strategy controller 14 creates a risk map indicating the distribution of the lane departure risk COR within the running width RW at the forward gaze pint (Xs, Ys). With reference to the risk map, the behavior strategy controller 14 computes the lane departure risk COR at the forward gaze point (Xs, Ys).

The following description explains one aspect of a procedure of creating the risk map by the behavior strategy controller 14 (lane departure risk computing portion 113).

Figure 4:
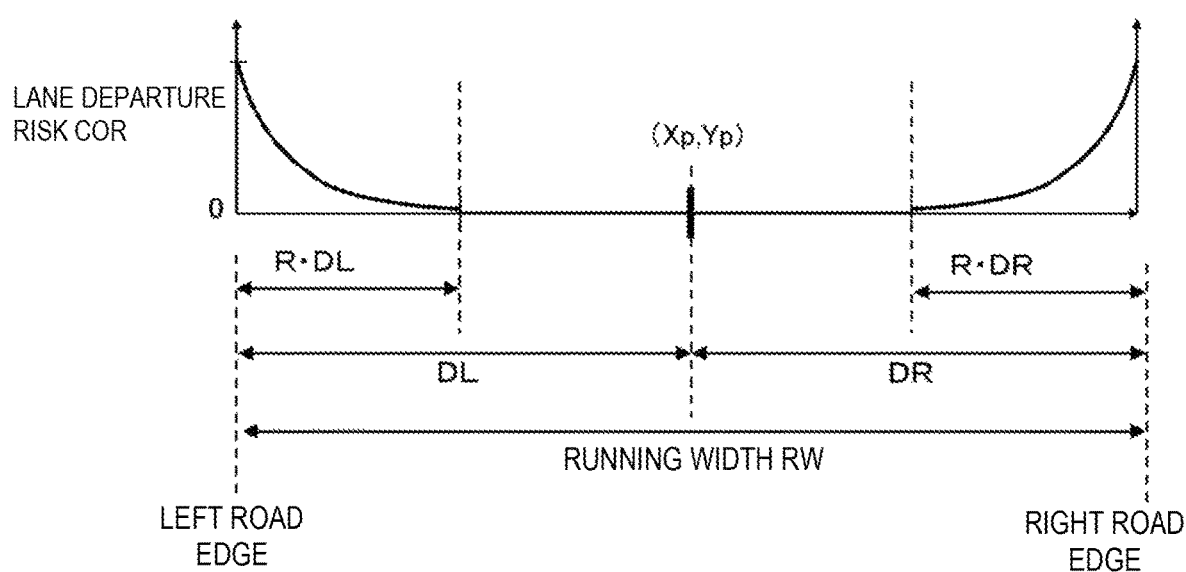
FIG. 4 is a chart showing one aspect of a lane departure risk map.

As illustrated in FIG. 4, in accordance with distance DL from a left edge of the running width RW to the target point coordinate (Xp, Yp) and distance DR from a right edge of the running width RW to the target point coordinate (Xp, Yp), the behavior strategy controller 14 sets an area in which the lane departure risk COR is increased in an exponential fashion and an area in which the lane departure risk COR is zero.

For example, the behavior strategy controller 14 sets as a first origin a position located within the running width RW, away from the left edge of the running width RW at a predetermined rate R in the distance DL (0<R<1.0), and exponentially increases the lane departure risk COR as the subject vehicle moves away from the first origin and approaches the left edge of the running width RW. At the same time, the behavior strategy controller 14 sets as a second origin a position located within the running width RW, away from the right edge of the running width WR at the predetermined rate R in the distance DR (0<R<1.0), and exponentially increases the lane departure risk COR as the subject vehicle moves away from the second origin and approaches the left edge of the running width RW. The behavior strategy controller 14 also sets the lane departure risk COR in an area between the first and second origins to zero.

The behavior strategy controller 14 computes the required yaw moment M$_{req}$, the largest yaw moment M$_{myu}$ the deviation angle θ$_{sp}$, and the lane departure risk COR as described above and outputs these results of the computation to the motion strategy controller 15.

At Step S306, the motion strategy controller 15 makes a comparison between the required yaw moment M$_{req}$ and the largest yaw moment M$_{myu}$.

In the present patent application, a positive yaw moment represents a right turning moment, and a negative yaw moment represents a left turning moment. At Step S306, the motion strategy controller 15 makes a comparison between an absolute value of the required yaw moment M$_{req}$ and an absolute value of the largest yaw moment M$_{myu}$.

When the required yaw moment M$_{req}$ is equal to or smaller than the largest yaw moment M$_{myu}$ (M$_{myu}$≥M$_{req}$), the required yaw moment M$_{req}$ can be generated under the condition of the current friction coefficient μ.

The motion strategy controller 15 then advances to Step S307. At Step S307, the motion strategy controller 15 outputs a command to generate the braking force in the inner-turning front and rear wheels to the wheel cylinder hydraulic pressure control device 10. The motion strategy controller 15 thus decelerates the vehicle 1 and imparts the required yaw moment M$_{req}$ to the vehicle 1.

In other words, at Step S307, the motion strategy controller 15 applies a greater breaking force to the inner-turning front and rear wheels than to outer-turning front and rear wheels, to thereby implement braking control for generating difference in braking force between the right and left wheels. In this way, the motion strategy controller 15 generates a yaw moment for making the subject vehicle follow the target locus.

The running state of the vehicle is stabilized by imparting the required yaw moment M$_{req}$ to the vehicle 1 while decelerating the vehicle 1.

When the required yaw moment M$_{req}$ is larger than the largest yaw moment M$_{myu}$ (M$_{myu}$<M$_{req}$), that is, when the moment that can be generated in the subject vehicle is smaller than the moment necessary for the subject vehicle to follow the target locus, the required yaw moment M$_{req}$ cannot be generated under the condition of the current friction coefficient μ by implementing the control for braking the inner-turning front and rear wheels.

In such a case, the motion strategy controller 15 switches from the braking control for braking the inner-turning front and rear wheels to the braking control for making the braking force generated in the rear wheels greater than the braking force generated in the front wheels.

A yaw moment M$_{ve}$ generated in the vehicle 1 is usually expressed by Mathematical 3.

$$M_{ve}=l_f \times FY_f - L_r \times FY_r$$ [Mathematical 3]

wherein FY$_f$ is a total lateral force on the two front wheels; FY$_r$ is a total lateral force on the two rear wheels; l$_f$ is distance between the gravity center and the front axle of the vehicle 1; and l$_r$ is distance between the gravity center and the rear front axle of the vehicle 1.

Mathematical 3 shows that the yaw moment M$_{ve}$ generated in the vehicle 1 increases as the total lateral force on the two rear wheels FY$_r$ approaches zero. The lateral force decreases with an increase of a driving/braking force.

When the yaw moment M$_{req}$ is larger than the largest yaw moment M$_{myu}$, the motion strategy controller 15 makes the braking force generated in the rear wheels greater than in the front wheels, instead of implementing the braking control for braking the inner-turning front and rear wheels. In other words, the motion strategy controller 15 implements the braking control that decreases the braking force distributed to the front wheels and increases the braking force distributed to the rear wheels.

The motion strategy controller 15 implements the braking control that stops braking the front wheels and imparts the braking force only to the rear wheels according to one aspect of the braking control for making the braking force generated in the rear wheels greater than in the front wheels.

When the braking force on the rear wheels becomes large, the total lateral force on the two rear wheels FY$_r$ approaches zero. As a result, the yaw moment M$_{ve}$ generated in the vehicle 1 becomes large, which makes it possible to generate the required yaw moment M$_{req}$.

That is, even if the road surface friction coefficient μ becomes small, and the largest yaw moment M$_{myu}$ becomes smaller than the required yaw moment M$_{req}$, the braking control that stops braking the front wheels and imparts the braking force only to the rear wheels makes it possible to generate the required yaw moment M$_{req}$ and repress the lane departure of the subject vehicle.

The following description explains in detail the braking force control implemented by the motion strategy controller 15 when the largest yaw moment $M_{myu}$ is smaller than the required yaw moment $M_{req}$ ($M_{myu} < M_{req}$).

Before switching the braking control, the motion strategy controller 15 first determines at Step S308 whether the lane departure risk COR computed by the behavior strategy controller 14 (lane departure risk computing portion 113) is higher than a threshold value THR, to thereby determine whether the possibility that the vehicle 1 departs from the running width RW is higher than a setting.

If the lane departure risk COR is higher than the threshold value THR, and the possibility that the subject vehicle departs from the running width RW within which the subject vehicle runs exceeds a set value, the motion strategy controller 15 outputs a command to apply full braking to all the wheels (four wheels) (command to impart the braking force to all the wheels) to the wheel cylinder hydraulic pressure control device 10 at Step S309.

In other words, when the lane departure risk COR is higher than the threshold value THR, and the possibility that the vehicle 1 departs from the running width RW is higher than the setting, the motion strategy controller 15 prioritizes deceleration over the following along the target locus and outputs the command to apply the full braking to all the wheels, to thereby reduce kinetic energy (energy of collision against a wall surface) in the event of departure.

Figure 5:
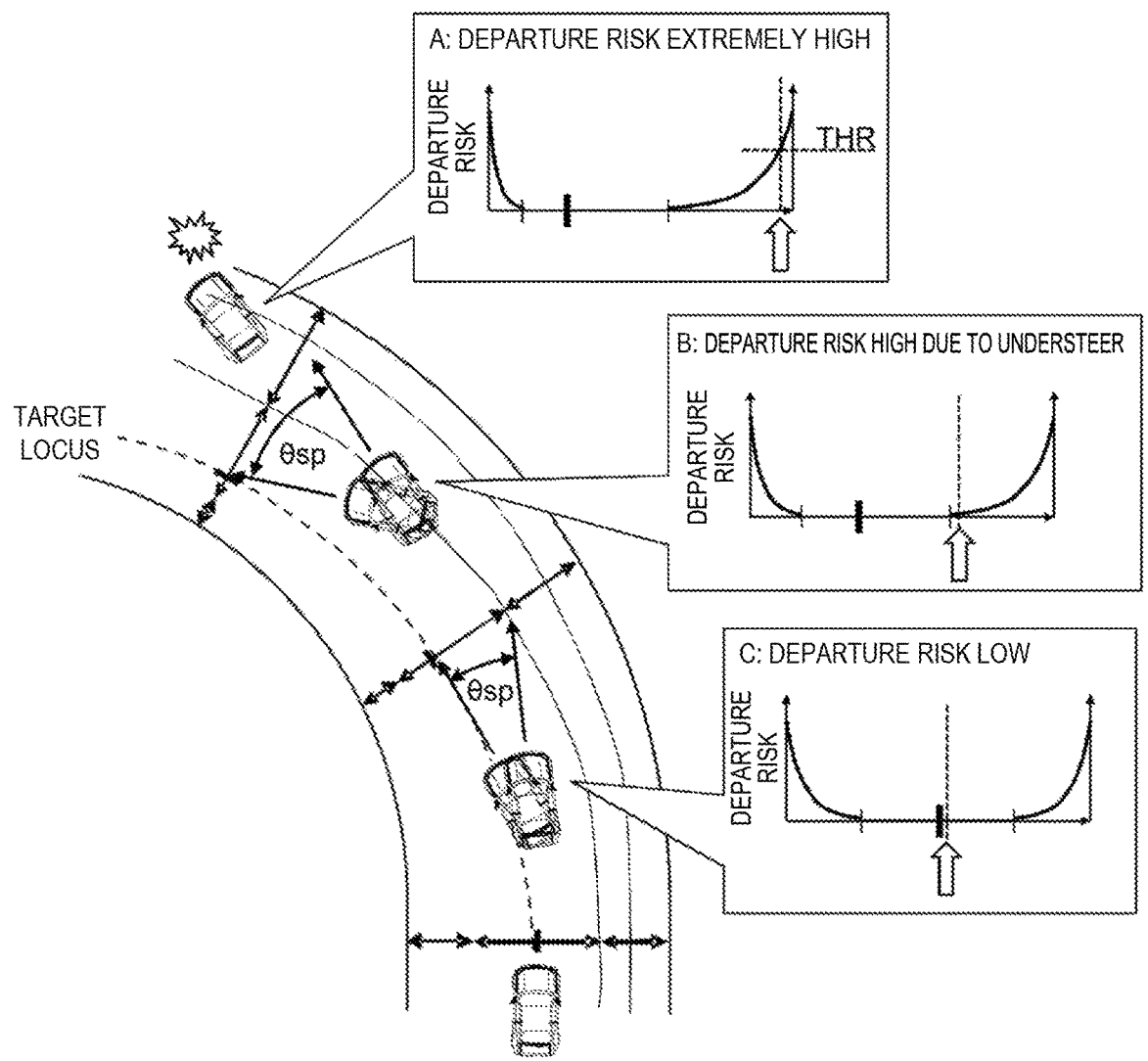
FIG. 5 shows one aspect of correlation between vehicle behavior and a lane departure risk COR in a situation where the vehicle makes a turn.

FIG. 5 shows one aspect of correlation between vehicle behavior and the lane departure risk COR in a situation where the vehicle 1 makes a turn.

The lane departure risk COR is set to a value that increases as the vehicle approaches the edge of the running width RW (road edge). The lane departure risk COR exceeds the threshold value THR when the vehicle 1 extremely approaches the road edge as illustrated in A of FIG. 5.

At this point of time, the motion strategy controller 15 issues the command to apply full braking to all the wheels for the purpose of repressing the lane departure and reducing the running speed (kinetic energy) in the event of departure.

The full braking refers to a braking state where the vehicle 1 is abruptly decelerated. The motion strategy controller 15 outputs to the wheel cylinder hydraulic pressure control device 10 a command to apply a highest hydraulic pressure or a hydraulic pressure in the vicinity of the highest hydraulic pressure to all the wheels (four wheels).

When the motion strategy controller 15 switches from the command to apply the braking force to the inner-turning front and rear wheels to the command to apply the full braking to all the wheels, the braking force generated in the outer-turning front and rear wheels is increased. When the motion strategy controller 15 switches from the command to make the braking force generated in the rear wheels greater than in the front wheels to the command to apply the full braking to all the wheels, the braking force generated in the front wheels is increased.

When the lane departure risk COR computed by the behavior strategy controller 14 (lane departure risk computing portion 113) is equal to or smaller than the threshold value THR, that is, when it is not required to apply the full braking to all the wheels, the motion strategy controller 15 advances from Step S308 to Step S310. At Step S310, the motion strategy controller 15 determines whether the deviation angle $\theta_{sp}$ is equal to or smaller than a preset angle TH$\theta$.

As illustrated in B of FIG. 5, for example, when distance from the subject vehicle to the edge of the running width RW (road edge) is ensured, and the lane departure risk COR is smaller than the threshold value THR, while on the other hand, the subject vehicle is on an understeer side, and therefore, the deviation angle $\theta_{sp}$ is large, there is a possibility that the subject vehicle later approaches the edge of the running width RW (road edge) and that the lane departure risk COR is increased. It is therefore desirable that the yaw moment is immediately imparted by braking.

As illustrated in C of FIG. 5, when the distance from the subject vehicle to the edge of the running width RW (road edge) is ensured; the lane departure risk COR is smaller than the threshold value THR; and the subject vehicle has a low tendency of understeer, and therefore, the deviation angle $\theta_{sp}$ is small, the lane departure risk COR is estimated to shift within a range of relatively small values.

The braking control that increases the braking force on the rear wheels rapidly generates the yaw moment and therefore sometimes impairs the running stability of the vehicle 1. In this light, it is not preferable to implement the braking control that might impair the running stability when the lane departure risk COR is estimated to shift within the range of relatively small values.

When the deviation angle $\theta_{sp}$ is equal to or smaller than the preset angle TH$\theta$; there is relatively enough time before the vehicle departs from the lane; and there is no urgent necessity for the braking control for repressing the lane departure, the motion strategy controller 15 advances to Step S311. At Step S311, the motion strategy controller 15 outputs to the wheel cylinder hydraulic pressure control device 10 a command to cancel the braking control for making the braking force generated in the rear wheels greater than in the front wheels.

The cancellation of the braking control for making the braking force generated in the rear wheels greater than in the front wheels reduces the braking force on the rear wheels and promptly recovers the lateral force on the rear wheels. This improves the running stability of the vehicle 1 that is making a turn. In other words, the braking control for making the braking force generated in the rear wheels greater than in the front wheels is preferably implemented when the deviation angle $\theta_{sp}$ exceeds the preset angle TH$\theta$.

If determining that the deviation angle $\theta_{sp}$ is larger than the preset angle TH$\theta$ at Step S310, the motion strategy controller 15 advances to Step S312. At Step S312, the motion strategy controller 15 outputs to the wheel cylinder hydraulic pressure control device 10 a braking command to make the braking force generated in the rear wheels greater than in the front wheels, thus repressing the lane departure of the vehicle 1.

In other words, when the deviation angle $\theta_{sp}$ exceeds the preset angle TH$\theta$, it is more highly likely that the lane departure occurs, as compared to when the deviation angle $\theta_{sp}$ is equal to or smaller than the preset angle TH$\theta$. In such a case, the braking control for repressing the lane departure is urgently needed. The motion strategy controller 15 then issues a command to implement the braking control for making the braking force (hydraulic pressure) generated in the rear wheels greater than in the front wheels.

The yaw moment $M_{ve}$ generated in the vehicle 1 is expressed by Mathematical 3 mentioned above. The yaw moment $M_{ve}$ is increased as the total lateral force $FY_r$ on the rear wheels approaches zero. An increase in the braking force on the rear wheels reduces the total lateral force $FY_r$ on the rear wheels close to zero.

The motion strategy controller 15 therefore outputs a braking command to the wheel cylinder hydraulic pressure control device 10. The braking command is to set the braking force generated in the front wheels to zero and generate the braking force only in the rear wheels. In this manner, the motion strategy controller 15 achieves the required yaw moment $M_{req}$.

The motion strategy controller 15, however, is capable of generating the braking force in the front wheels (maintaining a state where the braking force on the front wheels≠zero) and simultaneously outputting a command to make the braking force generated in the rear wheels greater than in the front wheels.

The motion strategy controller 15 makes the braking force generated in the rear wheels greater than in the front wheels, to thereby cause the vehicle 1 to make a turn like a spin turn to generate the yaw moment.

This represses the lane departure and allows the vehicle 1 to follow the target locus if the vehicle 1 comes into the understeer state when making a turn on a road surface with a small friction coefficient μ.

If the vehicle 1 comes into the understeer state, it is difficult to turn the vehicle 1 by operating a steering wheel. Even with steering control intervention, the motion strategy controller 15 implements the braking force control, which represses the lane departure.

If the motion strategy controller 15 has a function of the aforementioned braking force control, the braking force (hydraulic pressure) generated in the rear wheels becomes greater than in the front wheels when the friction coefficient μ of the road surface is small, and understeer occurs. If the subject vehicle excessively approaches the road edge while the braking force (hydraulic pressure) generated in the rear wheels is greater than in the front wheels, the braking is switched to the full braking.

The motion strategy controller 15 changes a command value of a hydraulic pressure adjusting amount of the rear wheels (braking force on the rear wheels) in accordance with the lane departure risk COR and the deviation angle $\theta_{sp}$.

Specifically, on the basis of a gain map that stores gains GB (GB≥1.0) in which variables are the lane departure risk COR and the deviation angle $\theta_{sp}$, the monitor strategy controller 15 searches a gain GB corresponding to the current lane departure risk COR and the current deviation angle $\theta_{sp}$. On the basis of the gain GB obtained by the search, the motion strategy controller 15 determines the command value of the hydraulic pressure adjusting amount of the rear wheels.

A higher lane departure risk COR indicates a higher possibility of the lane departure, and a larger deviation angle $\theta_{sp}$ also indicates a higher possibility of the lane departure. The motion strategy controller 15 increases the gain GB of the hydraulic pressure adjusting amount of the rear wheels with an increase of the lane departure risk COR and also increases the gain GB of the hydraulic pressure adjusting amount of the rear wheels with an increase of the deviation angle $\theta_{sp}$.

In other words, the motion strategy controller 15 increases the braking force generated in the rear wheels as the lane departure risk COR is increased, and also increases the braking force generated in the rear wheels as the deviation angle $\theta_{sp}$ is increased, to thereby swiftly achieve the required yaw moment $M_{req}$.

In short, the higher the lane departure risk COR and the deviation angle $\theta_{sp}$ are, the higher the possibility of the lane departure is. In such a case, the motion strategy controller 15 increases the gain GB and swiftly achieves the required yaw moment $M_{req}$, to thereby repress the lane departure in a highly responsive manner.

FIG. 6 shows one aspect of the gain map.

FIG. 6 illustrates a situation where a largest value of the lane departure risk COR is normalized to be 1.0 and where the gain GB is set to be variable within a range from 1 to 1.4 that is a largest value.

In FIG. 6, in an area where the deviation angle $\theta_{sp}$ is small, and the lane departure risk COR is low, the gain GB is set to 1.0, and the hydraulic pressure adjusting amount (braking force) of the rear wheels is set to a basic value.

The gain GB is changed to a larger value as the deviation angle $\theta_{sp}$ is increased or as the lane departure risk COR is increased. The hydraulic pressure adjusting amount (braking force) of the rear wheels is changed to a larger value with the increase of the gain GB.

In other words, the deviation angle $\theta_{sp}$ is increased with an increase of a tendency of the subject vehicle to understeer relative to the running course. The motion strategy controller (braking force output portion) 15 outputs to the wheel cylinder hydraulic pressure control device 10 a command to make the braking force generated in the rear wheel greater than in the front wheels as the deviation angle $\theta_{sp}$ is increased. The required yaw moment $M_{req}$ is thus swiftly achieved.

When the deviation angle $\theta_{sp}$ is decreased, the motion strategy controller 15 reduces the braking force generated in the rear wheels. In this way, the motion strategy controller 15 promptly recovers the lateral force on the rear wheels and stabilizes the vehicle 1.

In addition, the motion strategy controller 15 changes the hydraulic pressure distribution (braking force distribution) to the right and left rear wheels in accordance with the lane departure risk COR and the deviation angle $\theta_{sp}$ during the braking control for making the braking force generated in the rear wheels greater than in the front wheels.

If the lane departure risk COR is low, and the deviation angle $\theta_{sp}$ is small, the motion strategy controller 15 imparts a greater braking force to the inner-turning rear wheel than to the outer-turning rear wheel, to thereby accomplish both the running stability and turnability.

When the lane departure risk COR is high or when the deviation angle $\theta_{sp}$ is large, the motion strategy controller 15 applies the braking to the right and left rear wheels while reducing difference in the braking force between the right and left rear wheels. The motion strategy controller 15 thus approximates the total lateral force $FY_r$ (see Mathematical 3) on the two rear wheels to zero and generates the required yaw moment $M_{req}$.

More specifically, the motion strategy controller 15 outputs to the wheel cylinder hydraulic pressure control device 10 a command to make the braking force generated in the inner-turning rear wheel greater than the braking force generated in the outer-turning rear wheel as the deviation angle $\theta_{sp}$ is decreased. The motion strategy controller 15 also outputs to the wheel cylinder hydraulic pressure control device 10 a command to reduce the difference between the braking force generated in the inner-turning rear wheel and the braking force generated in the outer-turning rear wheel as the deviation angle $\theta_{sp}$ is increased.

Furthermore, the motion strategy controller 15 outputs to the wheel cylinder hydraulic pressure control device 10 a command to make the braking force generated in the inner-turning rear wheel greater than the braking force generated in the outer-turning rear wheel as the lane departure risk COR is decreased. The motion strategy controller 15 also outputs to the wheel cylinder hydraulic pressure control device 10 a command to reduce the difference between the braking force generated in the inner-turning rear wheel and the braking force generated in the outer-turning rear wheel as the lane departure risk COR is increased.

FIG. 7 shows one aspect of correlation between hydraulic pressure distribution FPD (%) to the inner-turning rear wheel and the lane departure risk COR and the deviation angle $\theta_{sp}$.

FIG. 7 illustrates a hydraulic pressure distribution map in a situation where the largest value of the lane departure risk COR is normalized to be 1.0 and where the hydraulic pressure distribution FPD is set to be variable within a range from 50% to 100%.

The motion strategy controller 15 determines the hydraulic pressure distribution FPD with reference to the map of FIG. 7. The motion strategy controller 15 thus sets the hydraulic pressure distribution FPD to 100% in an area where the lane departure risk COR is low and where the deviation angle $\theta_{sp}$ is small. As a result, the braking force imparted to the outer-turning rear wheel reaches zero, and the braking force is imparted only to the inner-turning rear wheel. Consequently, the running stability and the turnability are both accomplished.

The motion strategy controller 15 determines the hydraulic pressure distribution FPD with reference to the map of FIG. 7. The motion strategy controller 15 thus increases the braking force imparted to the outer-turning rear wheel to relatively reduce the braking force imparted to the inner-turning rear wheel as the lane departure risk COR is increased. This way, the motion strategy controller 15 reduces the difference in the braking force between the outer-turning wheel and the inner-turning wheel, to thereby approximate the total lateral force FYr on the two rear wheels to zero and generate the required yaw moment $M_{req}$.

The motion strategy controller 15, by determining the hydraulic pressure distribution FPD with reference to the map of FIG. 7, increases the braking force imparted to the outer-turning rear wheel to relatively reduce the braking force imparted to the inner-turning rear wheel with the increase of the deviation angle $\theta_{sp}$. The motion strategy controller 15 thus reduces the difference in the braking force between the outer-turning wheel and the inner-turning wheel, to thereby approximate the total lateral force $FY_r$ on the two rear wheels to zero and generate the required yaw moment $M_{req}$.

Figure 8:
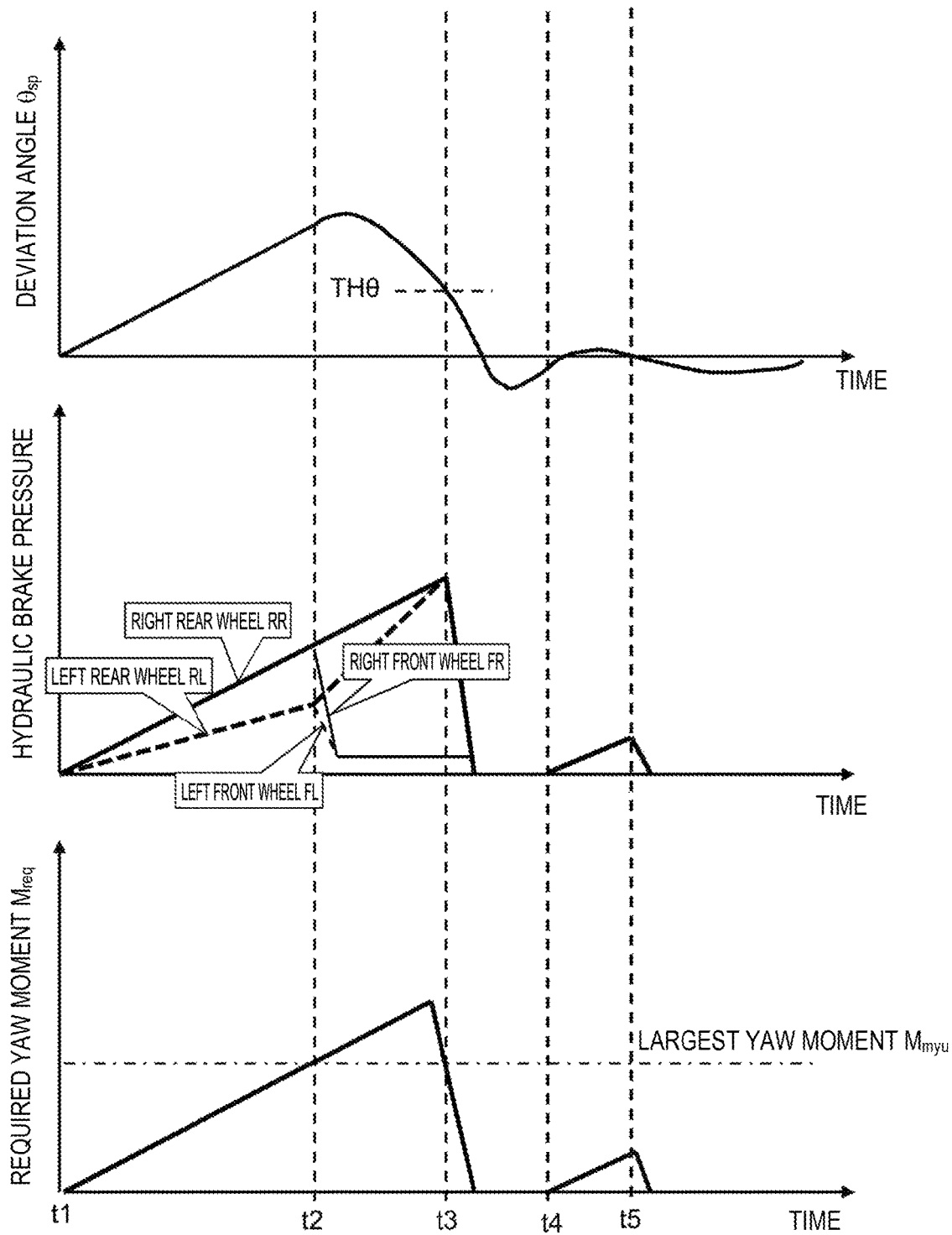
FIG. 8 is a time chart showing one aspect of changes in a required yaw moment $M_{req}$, an adjusting amount of hydraulic pressure applied to each wheel, and deviation angle $\theta_{sp}$ in a situation where the vehicle turns to the right.

FIG. 8 is a time chart showing one aspect of changes in the required yaw moment $M_{req}$, the hydraulic pressure adjusting amount with respect to each wheel, and the deviation angle $\theta_{sp}$ in a situation where the vehicle turns to the right during the braking control that is implemented by the behavior strategy controller 14 and the motion strategy controller 15 in accordance with the flowchart of FIG. 3.

In FIG. 8, the required yaw moment $M_{req}$ is equal to or smaller than the largest yaw moment $M_{myu}$ ($M_{myu}<M_{req}$) during a time period from time t1 to time t2. During this time period, the motion strategy controller 15 generates the required yaw moment $M_{req}$ by imparting the hydraulic pressure to the inner-turning front wheel (right front wheel FR) and the inner-turning rear wheel (right rear wheel RR).

When the required yaw moment $M_{req}$ becomes larger than the largest yaw moment $M_{myu}$ ($M_{myu}<M_{req}$) at or after the time t2, the motion strategy controller 15 approximates the total lateral force $FY_r$ on the two rear wheels to zero by decreasing the hydraulic pressure imparted to the front wheels and increasing the hydraulic pressure imparted to the rear wheels. The motion strategy controller 15 thus increases the yaw moment $M_{ve}$ (right turning moment) that is generated in the vehicle 1.

When the large yaw moment $M_{ve}$ (right turning moment) is generated due to the increase of the hydraulic pressure imparted to the rear wheels, the deviation angle $\theta_{sp}$ becomes decreased. If the deviation angle $\theta_{sp}$ is decreased to a predetermined value at time t3, the motion strategy controller 15 ends the braking control for causing the subject vehicle to follow the target locus (repressing the lane departure).

The required yaw moment $M_{req}$ is equal to or smaller than the largest yaw moment $M_{myu}$ ($M_{myu} \geq M_{req}$) during a time period from time t4 to time t5. During this time period, the motion strategy controller 15 generates the required yaw moment $M_{req}$ by imparting the hydraulic pressure to the inner-turning front wheel (right front wheel FR) and the inner-turning rear wheel (right rear wheel RR).

The technical elements discussed in the foregoing embodiment may be used in any combination without inconsistency.

The invention has been specifically discussed with reference to the preferred embodiments. However, it is obvious in view of the basic technical idea and teachings of the invention for a person with ordinary skill in the art that the invention may be modified in various ways.

For example, the behavior strategy controller 14 (lane departure risk computing portion 113) is capable of changing the risk distribution of the risk map in accordance with any one of running conditions including a road curvature, vehicle speed, road surface friction coefficient, an oversteer/understeer tendency, and other like conditions.

The motion strategy controller 15 is capable of changing the difference between the braking force generated in the front wheels and the braking force generated in the rear wheels during the braking control that makes the braking force (hydraulic pressure) generated in the rear wheels greater than in the front wheels in accordance with at least one of the deviation between the required yaw moment $M_{req}$ and the largest yaw moment $M_{myu}$, the deviation angle $\theta_{sp}$, and the lane departure risk COR.

The driving assist system of FIG. 1 includes the behavior strategy controller 14 that computes the required yaw moment $M_{req}$, the largest yaw moment $M_{myu}$ and the like and the motion strategy controller 15 that determines the braking force distribution on the basis of the required yaw moment $M_{req}$, the largest yaw moment $M_{myu}$ and the like. It is possible, however, to utilize a single controller to carry out the computation processing of the required yaw moment $M_{req}$, the largest yaw moment $M_{myu}$ and the like and the computation processing of the braking force distribution. It is also possible to share computation processing functions among three or more controllers.

The invention may be so configured that the behavior strategy controller 14 is used to perform the computation of the target point coordinate, the forward gaze point, the road edge information, the subject vehicle's position and the like, and that the motion strategy controller 15 is used to perform the computation of the required yaw moment $M_{req}$ and the largest yaw moment $M_{myu}$, the computation of the braking force distribution and the like. The computation processing function performed by the behavior strategy controller 14 and the computation processing function performed by the motion strategy controller 15 are not limited to the functions carried out according to the mode illustrated in FIG. 2.

Although several embodiments of the invention have been discussed, these embodiments are not intended to limit the invention but to facilitate the understanding of the invention. The invention may be modified or improved without deviating from the gist thereof and includes equivalents thereto.

The elements mentioned in the claims and the description may be freely combined or omitted as long as at least a part of the above-mentioned problem is solved or at least a part of the advantageous effects is produced.

The present application claims priority under Japanese Patent Application No. 2018-23315 filed on Feb. 13, 2018. The entire disclosure of Japanese Patent Application No. 2018-23315 filed on Feb. 13, 2018 including the description, claims, drawings and abstract, is incorporated herein by reference in its entirety.

REFERENCE SIGNS LIST

1: Vehicle
6 to 9: Wheel cylinder
10: Wheel cylinder hydraulic pressure control device (braking control device)
12: Steering device
13: External environment recognition control unit
14: Behavior strategy controller
15: Motion strategy controller
101: Road surface friction coefficient acquisition portion (road surface condition acquisition portion)
102: Vehicle driving state detection sensor
103: Vehicle specifications input portion
104: External environment recognition portion
105: Target locus computing portion
106: Subject vehicle position computing portion
107: Forward gaze point computing portion
108: Road edge information computing portion
109: Target point coordinate computing portion
110: Limit moment computing portion
111: Brake moment computing portion
112: Deviation angle computing portion
113: Lane departure risk computing portion

The invention claimed is:

1. A driving assist device configured to:
obtain a first moment that is a moment necessary for an subject vehicle to follow a running course, on the basis of information about the subject vehicle's running course obtained on the basis of information about an external environment around the subject vehicle, which is acquired by an external environment recognition portion, a first physical quantity associated with a motion state of the subject vehicle, which is inputted by a vehicle motion state detection sensor, and specifications of the subject vehicle,
obtain a second moment that is a moment that can be generated in the subject vehicle on the basis of a friction coefficient of a contacted road surface with respect to wheels of the subject vehicle, which is acquired by a road surface condition acquisition portion, and a second physical quantity associated with the motion state of the subject vehicle, which is inputted by the vehicle motion state detection sensor, and
output to a braking control device a command to implement control for making a braking force generated in rear wheels of the wheels greater than a braking force generated in front wheels when the second moment is smaller than the first moment,
wherein the driving assist device outputs to the braking control device a command to impart a braking force to all the wheels when risk that the subject vehicle departs from a running width which is obtained on the basis of the external environment information exceeds a predetermined value,
wherein the driving assist device outputs to the braking control device a command to implement control for making the braking force generated in the rear wheels of the wheels greater than the braking force generated in the front wheels when a deviation angle exceeds a predetermined angle, the deviation angle being formed between a first straight line connecting a current position of the subject vehicle, which is obtained on the basis of the external environment information, and a forward position indicating a position of the subject vehicle after an elapse of a predetermined period of time, which is obtained on the basis of the current position, and a second straight line connecting the current position and a target position located on the running course,
wherein the driving assist device outputs to the braking control device a command to control the braking force so that the braking force generated in an inner-turning rear wheel becomes greater than the braking force generated in an outer-turning rear wheel as the deviation angle is decreased, and
wherein the driving assist device outputs to the braking control device a command to wherein the driving assist device outputs to the braking control device a command to implement control for reducing difference between the braking force generated in the inner-turning rear wheel and the braking force generated in the outer-turning rear wheel as the deviation angle is increased.

2. The driving assist device according to claim 1, wherein the driving assist device outputs to the braking control device a command to generate the braking force in inner-turning wheels of the wheels when the second moment is equal to or larger than the first moment.

3. A driving assist device configured to:
obtain a first moment that is a moment necessary for an subject vehicle to follow a running course, on the basis of information about the subject vehicle's running course obtained on the basis of information about an external environment around the subject vehicle, which is acquired by an external environment recognition portion, a first physical quantity associated with a motion state of the subject vehicle, which is inputted by a vehicle motion state detection sensor, and specifications of the subject vehicle,
obtain a second moment that is a moment that can be generated in the subject vehicle on the basis of a friction coefficient of a contacted road surface with respect to wheels of the subject vehicle, which is acquired by a road surface condition acquisition portion, and a second physical quantity associated with the motion state of the subject vehicle, which is inputted by the vehicle motion state detection sensor, and
output to a braking control device a command to implement control for making a braking force generated in rear wheels of the wheels greater than a braking force generated in front wheels when the second moment is smaller than the first moment,
wherein the driving assist device outputs to the braking control device a command to impart a braking force to all the wheels when risk that the subject vehicle departs from a running width which is obtained on the basis of the external environment information exceeds a predetermined value,
wherein the driving assist device outputs to the braking control device a command to implement control for making the braking force generated in the rear wheels of the wheels greater than the braking force generated in the front wheels when a deviation angle exceeds a predetermined angle, the deviation angle being formed between a first straight line connecting a current position of the subject vehicle, which is obtained on the basis of the external environment information, and a forward position indicating a position of the subject vehicle after an elapse of a predetermined period of time, which is obtained on the basis of the current position, and a second straight line connecting the current position and a target position located on the running course, wherein the driving assist device outputs to the braking control device a command to implement control for making the braking force generated in the inner-turning rear wheel greater than the braking force generated in the outer-turning rear wheel as the departure risk is decreased, and wherein the driving assist device outputs to the braking control device a command to wherein the driving assist device outputs to the braking control device a command to implement control for reducing difference between the braking force generated in the inner-turning rear wheel and the braking force generated in the outer-turning rear wheel as the departure risk is increased.

4. The driving assist device according to claim 3, wherein the driving assist device outputs to the braking control device a command to generate the braking force in inner-turning wheels of the wheels when the second moment is equal to or larger than the first moment.

5. A driving assist device configured to:

obtain a first moment that is a moment necessary for an subject vehicle to follow a running course, on the basis of information about the subject vehicle's running course obtained on the basis of information about an external environment around the subject vehicle, which is acquired by an external environment recognition portion, a first physical quantity associated with a motion state of the subject vehicle, which is inputted by a vehicle motion state detection sensor, and specifications of the subject vehicle, obtain a second moment that is a moment that can be generated in the subject vehicle on the basis of a friction coefficient of a contacted road surface with respect to wheels of the subject vehicle, which is acquired by a road surface condition acquisition portion, and a second physical quantity associated with the motion state of the subject vehicle, which is inputted by the vehicle motion state detection sensor, and output to a braking control device a command to implement control for making a braking force generated in rear wheels of the wheels greater than a braking force generated in front wheels when the second moment is smaller than the first moment, wherein when a deviation angle exceeds a predetermined angle, the deviation angle being formed between a first straight line connecting a current position of the subject vehicle, which is obtained on the basis of the external environment information, and a forward position indicating a position of the subject vehicle after an elapse of a predetermined period of time, which is obtained on the basis of the current position, and a second straight line connecting the current position and a target position located on the running course, the driving assist device outputs to the braking control device a command to implement control for making the braking force generated in the rear wheels of the wheels greater than the braking force generated in the front wheels, outputs to the braking control device a command to implement control for making outputs to the braking control device a command to implement control for making the braking force generated in an inner-turning rear wheel greater than the braking force generated in an outer-turning rear wheel as the deviation angle is decreased, and outputs to the braking control device a command to implement control for reducing difference between the braking force generated in the inner-turning rear wheel and the braking force generated in the outer-turning rear wheel as the deviation angle is increased.

6. The driving assist device according to claim 5, wherein the driving assist device outputs to the braking control device a command to generate the braking force in inner-turning wheels of the wheels when the second moment is equal to or larger than the first moment.

7. A driving assist method comprising:

obtaining a first moment that is a moment necessary for an subject vehicle to follow a running course, on the basis of information about the running course of the subject vehicle, which is obtained on the basis of external environment information of the subject vehicle, which is acquired by an external environment recognition portion, a first physical quantity associated with a motion state of the subject vehicle, which is inputted by a vehicle motion state detection sensor, and specifications of the subject vehicle, obtaining a second moment that is a moment that can be generated in the subject vehicle on the basis of a friction coefficient of a contacted road surface with respect to wheels of the subject vehicle, which is acquired by a road surface condition acquisition portion, and a second physical quantity associated with the motion state of the subject vehicle, which is inputted by the vehicle motion state detection sensor, outputting to a braking control device a command to implement control for making a braking force generated in rear wheels of the wheels greater than a braking force generated in front wheels when the second moment is smaller than the first moment, outputting to the braking control device a command to impart a braking force to all the wheels when risk that the subject vehicle departs from a running width which is obtained on the basis of the external environment information exceeds a predetermined value, outputting to the braking control device a command to implement control for making the braking force generated in the rear wheels of the wheels greater than the braking force generated in the front wheels when a deviation angle exceeds a predetermined angle, the deviation angle being formed between a first straight line connecting a current position of the subject vehicle, which is obtained on the basis of the external environment information, and a forward position indicating a position of the subject vehicle after an elapse of a predetermined period of time, which is obtained on the basis of the current position, and a second straight line connecting the current position and a target position located on the running course, outputting to the braking control device a command to control the braking force so that the braking force generated in an inner-turning rear wheel becomes greater than the braking force generated in an outer-turning rear wheel as the deviation angle is decreased, and outputting to the braking control device a command to implement control for reducing difference between the braking force generated in the inner-turning rear wheel and the braking force generated in the outer-turning rear wheel as the deviation angle is increased.

8. A driving assist system comprising:

an external environment recognition portion configured to acquire information about external environment ahead of a vehicle;

a running course computing portion configured to obtain information about a running course of the vehicle on the basis of the information about the external environment ahead of the vehicle, which is acquired by the external environment recognition portion;

a vehicle motion state detection sensor configured to detect a physical quantity associated with a motion state of the vehicle;

a vehicle specifications input portion in which information about specifications of the vehicle is inputted;

a first moment computing portion configured to obtain a first moment that is a moment necessary for the vehicle to follow the running course, on the basis of the information about the running course of the vehicle, which is obtained by the running course computing portion, a first physical quantity associated with the motion state of the vehicle, which is detected by the vehicle motion state detection sensor, and the specifications of the vehicle, which are inputted by the vehicle specifications input portion;

a road surface friction coefficient acquisition portion configured to acquire a friction coefficient of a contacted road surface with respect to wheels of the vehicle;

a second moment computing portion configured to obtain a second moment that is a moment that can be generated in the vehicle, on the basis of the friction coefficient of the contacted road surface with respect to the wheels of the vehicle, which is obtained by the road surface friction coefficient acquisition portion, and a second physical quantity associated with the motion state of the vehicle, which is detected by the vehicle motion state detection sensor; and a braking force output portion configured to make a comparison between the first moment obtained by the first moment computing portion and the second moment obtained by the second moment computing portion, and output to a braking control device a command to implement control for making a braking force generated in rear wheels of the wheels greater than a braking force generated in front wheels when the second moment is smaller than the first moment, wherein the braking force output portion outputs to the braking control device a command to impart a braking force to all the wheels when risk that the subject vehicle departs from a running width which is obtained on the basis of the external environment information exceeds a predetermined value, wherein the braking force output portion outputs to the braking control device a command to implement control for making the braking force generated in the rear wheels of the wheels greater than the braking force generated in the front wheels when a deviation angle exceeds a predetermined angle, the deviation angle being formed between a first straight line connecting a current position of the subject vehicle, which is obtained on the basis of the external environment information, and a forward position indicating a position of the subject vehicle after an elapse of a predetermined period of time, which is obtained on the basis of the current position, and a second straight line connecting the current position and a target position located on the running course, wherein the braking force output portion outputs to the braking control device a command to control the braking force so that the braking force generated in an inner-turning rear wheel becomes greater than the braking force generated in an outer-turning rear wheel as the deviation angle is decreased, and wherein the braking force output portion outputs to the braking control device a command to implement control for reducing difference between the braking force generated in the inner-turning rear wheel and the braking force generated in the outer-turning rear wheel as the deviation angle is increased.

* * * * *